Feb. 7, 1939.　　　　　　C. H. GOODER　　　　　　2,145,926
TRUCK BODY
Filed Aug. 9, 1937

INVENTOR.
Clarence H. Gooder,
BY
Barnwell R. King,
HIS ATTORNEY.

Patented Feb. 7, 1939

2,145,926

UNITED STATES PATENT OFFICE 2,145,926

TRUCK BODY

Clarence H. Gooder, Scotts, Mich.

Application August 9, 1937, Serial No. 158,101

2 Claims. (Cl. 296—10)

This invention relates to vehicle bodies and more particularly to automotive truck bodies of the open type having drop sides for loading and unloading the same.

The main objects of my invention are:

First, to provide a vehicle body having drop sides hinged to the bed in such a way that the sides may be moved longitudinally to provide a side opening while the truck is adjacent a loading platform which would interfere with the operation of a conventional drop side.

Second, to provide improved means for connecting the sides of a vehicle body to the bed thereof.

Third, to provide a truck body that is simple and economical in its parts, and very efficient and effective for the purpose intended.

With these and other objects in view, the invention consists of certain novel features of construction, combination, and arrangement of parts, as will be more fully described, and particularly pointed out in the appended claims.

Figure 1:
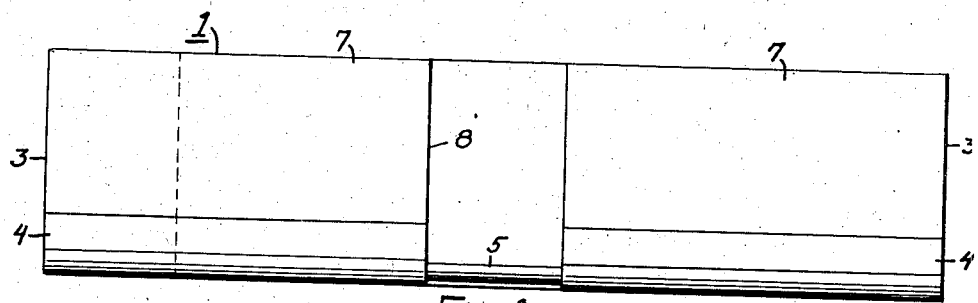
Fig. 1 is a view in side elevation of a truck body constructed in accordance with my invention.

Referring to the drawing, 1 is a vehicle body comprising a bed 2 and sides 3, 3. To each side is secured a moveable hinge member 4 coacting with a stationary hinge member fixed to the bed. The hinge members are curled downwardly and inwardly in overhanging relation to the opposite edges of the bed so that the sides 3 are adjustable longitudinally as well as rotatably relative thereto.

Figure 4:
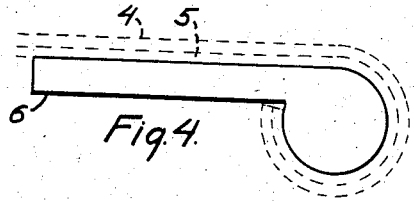
Fig. 4 is a view in end elevation of a mandrel which I prefer to use in forming my hinge.

The hinge members 4 and 5 are preferably formed of sheet metal on the mandrel 6, as shown by Fig. 4 which is substantially full scale, the hinge members being shown in dotted lines. However, the thickness of the hinge members is exaggerated for clarity in showing. After being formed the hinge members are secured to the sides and bed, respectively, of the truck body.

Figure 2:
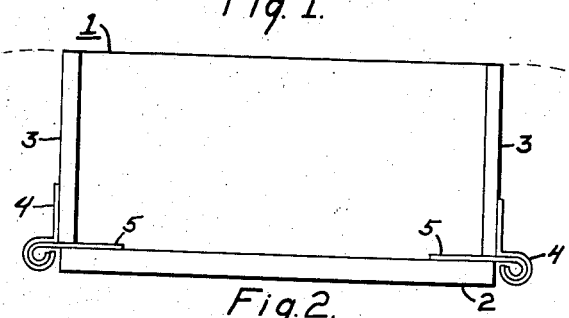
Fig. 2 is a view in end elevation.
Figure 3:
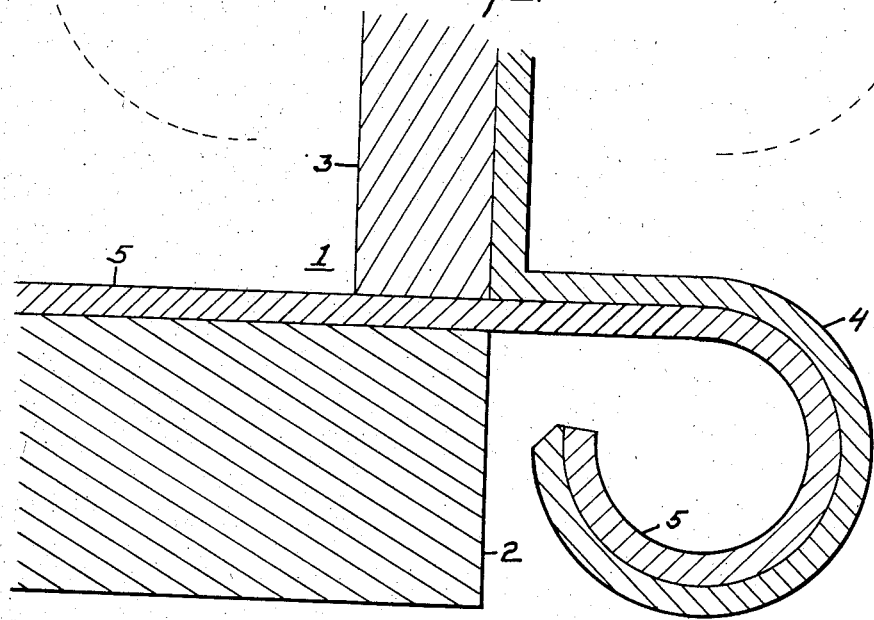
Fig. 3 is an enlarged fragmentary view in cross section of the truck body.

The curled overlapping relation between the hinge members is preferably such that the sides of the body may be dropped, or slid parallel to the edge of the bed to provide a side opening 8 in the truck body, as shown by Figs. 1 and 2, for loading and unloading the vehicle.

It will be understood by those skilled in the art that I provide a "one stop" side opening and closing means for truck bodies. This is very advantageous where the truck is driven alongside a loading platform which would interfere with dropping the sides of the truck body. With my truck body, the truck may be driven directly adjacent a milk house door, for example, and the side sections 7, 7 manipulated to provide the side opening 8 which may be closed without moving the truck away from the platform. Further, if desired, the sides of my truck body can be slid off the bed to leave a clear platform rack having rolled edges at its opposite sides.

The curvature of the hinge member is preferably such that they frictionally bind when the sides are in upright position to prevent rattling and displacement thereof in use. The side sections of my truck body are preferably held rigidly together by means of yokes, not shown, which are dropped over the side sections at their joints. The side sections are connected to the head and tail gates of the truck body in any conventional manner.

Various changes in the form, proportion, and the minor details of construction may be resorted to without departing from the principle or sacrificing any of the advantages of my invention.

I claim:

1. In a truck body the combination with a bed and a plurality of side sections, of a stationary hinge member secured to either edge of said bed and curled downwardly and inwardly in overhanging relation thereto, the said stationary hinge member being located completely below the plane of the bed or the prolongation of the plane of the bed, and a movable hinge member secured to the bottom edge of each side section and curled in overlapping relation with said stationary hinge member, the movable hinge members being longitudinally and rotatably adjustable relative to their stationary hinge member so that said side sections can be turned down or slid longitudinally of the bed, as desired, to provide a side opening in the truck body, said stationary hinge member presenting a smooth outer surface when uncovered.

2. A combination of elements as set forth in claim 1 but also having means whereby the two said members frictionally bind together to hold the side sections against longitudinal movement when in a certain angular position.

CLARENCE H. GOODER.